United States Patent
Marchione et al.

(10) Patent No.: US 10,040,495 B2
(45) Date of Patent: Aug. 7, 2018

(54) LASER BRAZING OF ANNULAR METAL SEAL MEMBER ON TRACK LINK

(71) Applicant: Caterpillar Inc., Peoria, IL (US)

(72) Inventors: Thierry Andre Marchione, Heber City, UT (US); Brent David Widder, Washington, IL (US); Timothy Arthur Thorson, Chillicothe, IL (US); Gregory Jerome Kaufmann, Metamora, IL (US)

(73) Assignee: Caterpillar Inc., Deerfield, IL (US)

( * ) Notice: Subject to any disclaimer, the term of this patent is extended or adjusted under 35 U.S.C. 154(b) by 336 days.

(21) Appl. No.: 14/962,409

(22) Filed: Dec. 8, 2015

(65) Prior Publication Data

US 2017/0158269 A1 Jun. 8, 2017

(51) Int. Cl.
  *B62D 55/32* (2006.01)
  *B62D 55/088* (2006.01)
  *B23K 1/005* (2006.01)
  *B62D 55/092* (2006.01)
  *B62D 55/21* (2006.01)

(52) U.S. Cl.
  CPC ............ *B62D 55/32* (2013.01); *B23K 1/0056* (2013.01); *B62D 55/0887* (2013.01); *B62D 55/092* (2013.01); *B62D 55/21* (2013.01)

(58) Field of Classification Search
  CPC ..... B23K 1/0056; B62D 55/32; B62D 55/088
  USPC .................................................... 219/121.64
  See application file for complete search history.

(56) References Cited

U.S. PATENT DOCUMENTS

| 6,371,577 | B1 * | 4/2002 | Hasselbusch .......... B62D 55/08 305/100 |
| 6,386,651 | B1 | 5/2002 | Gerardin et al. |
| 6,739,680 | B2 | 5/2004 | Hasselbusch et al. |
| 6,783,196 | B2 | 8/2004 | Maguire et al. |
| 7,850,256 | B2 | 12/2010 | Mulligan |
| 2012/0153715 | A1 | 6/2012 | Tsubaki et al. |
| 2012/0267947 | A1 | 10/2012 | Johannsen et al. |

FOREIGN PATENT DOCUMENTS

JP 2007-136532 6/2007

\* cited by examiner

*Primary Examiner* — Samuel M Heinrich
(74) *Attorney, Agent, or Firm* — Finnegan, Henderson, Farabow, Garrett & Dunner, LLP

(57) ABSTRACT

A method of manufacturing an undercarriage track joint assembly includes forming at least a first portion of a seal assembly by laser brazing an annular, metal sealing washer to a first track link of the undercarriage track joint assembly. The method may also include performing the laser brazing to form at least one of an annular fillet of braze material between the first track link and at least a portion of an inner diameter surface of the washer and an annular fillet of braze material between the first track link and at least a portion of an outer diameter surface of the washer. The method may still further include inserting a second portion of the seal assembly into a counterbore formed in an axial face of a second track link of the track joint assembly such that an axial sealing face of the washer opposite from the first track link slidably engages with the second portion of the seal assembly on the second track link of the track joint assembly to form a sealing surface between the first and second track links.

16 Claims, 6 Drawing Sheets ated to each other 20
LASER BRAZING OF ANNULAR METAL SEAL MEMBER ON TRACK LINK

TECHNICAL FIELD

The present disclosure relates generally to track links for undercarriage track joint assemblies and, more particularly, to laser brazing of an annular metal seal member on a track link.

BACKGROUND

Many earth-working machines, such as, for example, loaders, tractors, and excavators, include tracked undercarriages to facilitate movement of the machines over ground surfaces. Such undercarriages include drive sprockets that rotate track assemblies about one or more idlers or other guiding components to propel the machines over the ground surfaces. Each track assembly includes a pair of parallel chains, each made up of a series of links, joined to each other by pins and/or bushings (the combination of which is sometimes referred to as a cartridge assembly). Due to wear from abrasion and impacts experienced during use, undercarriage maintenance costs often constitute more than one quarter of the total costs associated with operating the earth-working machines.

A known cartridge assembly for coupling links is disclosed in U.S. Patent Application Publication No. 2012/0267947 by Johannsen et al. ("the '947 publication"). The cartridge assembly includes a pin accommodated within an inner bushing, which is, in turn, accommodated within an outer bushing. End portions of the inner bushing are surrounded by inserts, and end portions of the pin are surrounded by collars. The pin is provided with a central, axially oriented lubricant channel, which serves as a reservoir for lubricant and delivers lubricant to a gap between the pin and the inner bushing, and to a gap between the inner bushing and the outer bushing. The lubricant is retained by seals positioned between the outer bushing and inserts, and by seals positioned between the inserts and collars positioned around the axial ends of the pin.

The cartridge assembly of the '947 publication may provide certain benefits that are particularly important for some applications. However, it may have certain drawbacks. For example, the seals described in the '947 publication as being positioned between inserts and bushings may increase the complexity and cost of the cartridge while reducing the expected wear life of the track joint assembly. The disclosed embodiments may help solve these problems.

SUMMARY

One disclosed embodiment relates to a method of manufacturing an undercarriage track joint assembly. The method may include forming at least a first portion of a seal assembly by laser brazing an annular, metal sealing washer to a first track link of the undercarriage track joint assembly. The method may further include performing the laser brazing to form at least one of an annular fillet of braze material between the first track link and at least a portion of an inner diameter surface of the washer and an annular fillet of braze material between the first track link and at least a portion of an outer diameter surface of the washer. The method may still further include inserting a second portion of the seal assembly into a counterbore formed in an axial face of a second track link of the track joint assembly such that an axial sealing face of the washer opposite from the first track link slidably engages with the second portion of the seal assembly on the second track link of the track joint assembly to form a sealing surface between the first and second track links.

Another disclosed embodiment relates to a method of manufacturing a seal assembly for an undercarriage track joint assembly. The method may include forming at least a first portion of the seal assembly for engagement within a counterbore formed in an axial face of a first track link of undercarriage track joint assembly, and laser brazing an annular, metal sealing washer to a second track link of the undercarriage track joint assembly such that the washer is positioned on an axial end face of the second track link with an axial sealing face of the washer configured to be slidably engaged with the first portion of the seal assembly when the first and second track links are assembled into the undercarriage track joint assembly. The method may further include performing the laser brazing to form at least one of an annular fillet of braze material between the second track link and at least a portion of an inner diameter surface of the washer and an annular fillet of braze material between the second track link and at least a portion of an outer diameter surface of the washer.

A further disclosed embodiment relates to a seal assembly for an undercarriage track joint assembly. The seal assembly may include at least a first portion of the seal assembly configured for engagement within a counterbore formed in an axial face of a first track link of the track joint assembly. An annular, metal sealing washer may be laser brazed to an axial face of a second track link of the track joint assembly such that the washer is positioned at least partially within a recess formed in the axial face of the second track link, and positioned with an axial sealing face of the washer configured to be slidably engaged with the first portion of the seal assembly when the first and second track links are assembled into the undercarriage track joint assembly. The seal assembly may also include at least one of an annular fillet of braze material formed by the laser brazing and located between an annular shoulder of the recess and at least a portion of an inner diameter surface of the washer and an annular fillet of braze material formed by the laser brazing and located between the axial face of the second track link and at least a portion of an outer diameter surface of the washer.

DETAILED DESCRIPTION

Figure 1:
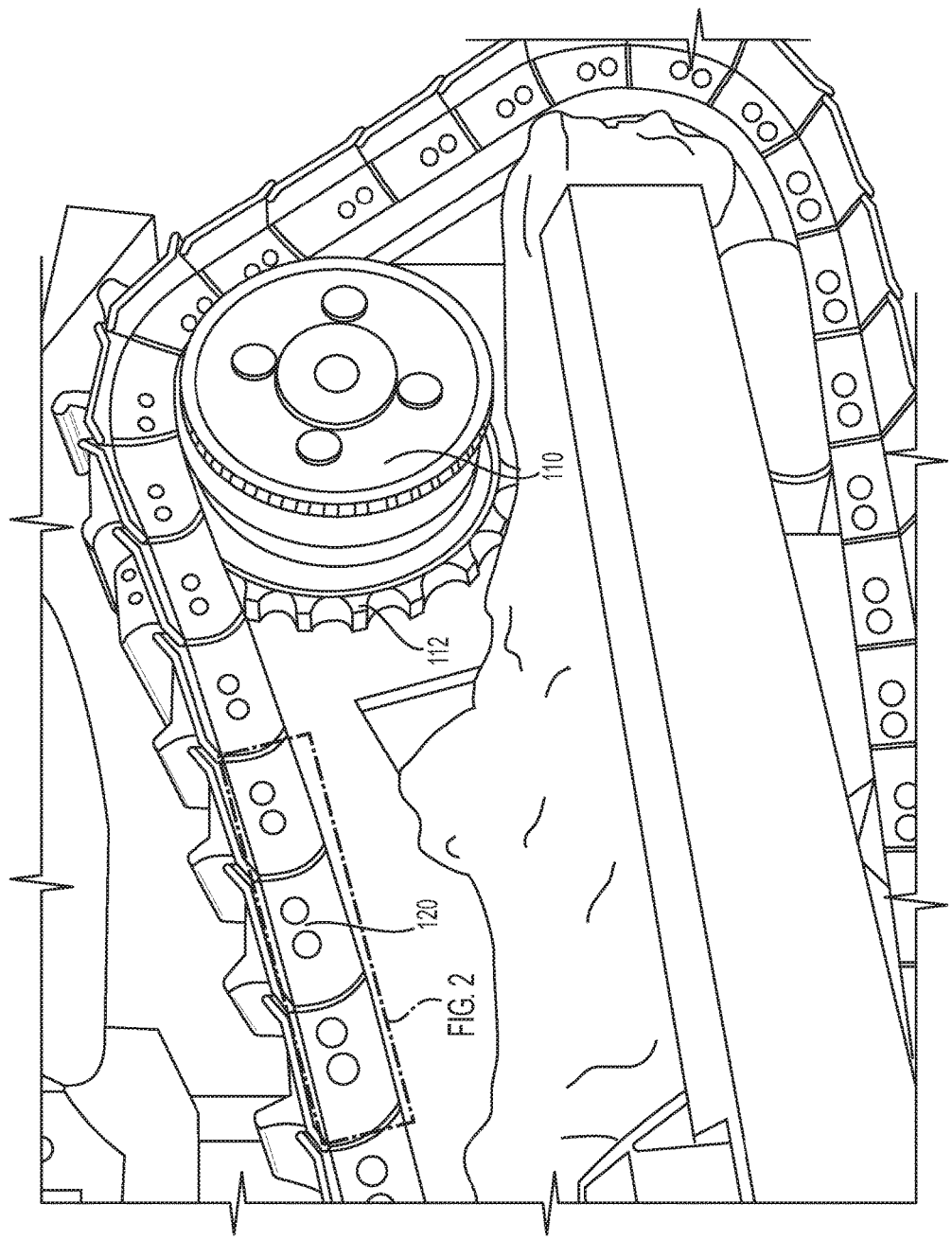
FIG. 1 is a perspective view of a portion of a track-type machine showing a track joint assembly according to the present disclosure.

FIG. 1 illustrates a portion of an exemplary track-type machine, including an undercarriage track joint assembly 120 engaged with a drive sprocket 110. The track-type machine may be a loader, a tractor, an excavator, a tank, or another mobile machine having track-type traction devices. When operated, the drive sprocket teeth 112 may engage with the undercarriage track joint assembly 120, and the drive sprocket 110 of the track-type machine may rotate the undercarriage track joint assembly 120 about one or more idlers or other guiding components (not shown) to facilitate movement of the track-type machine.

Figure 2:
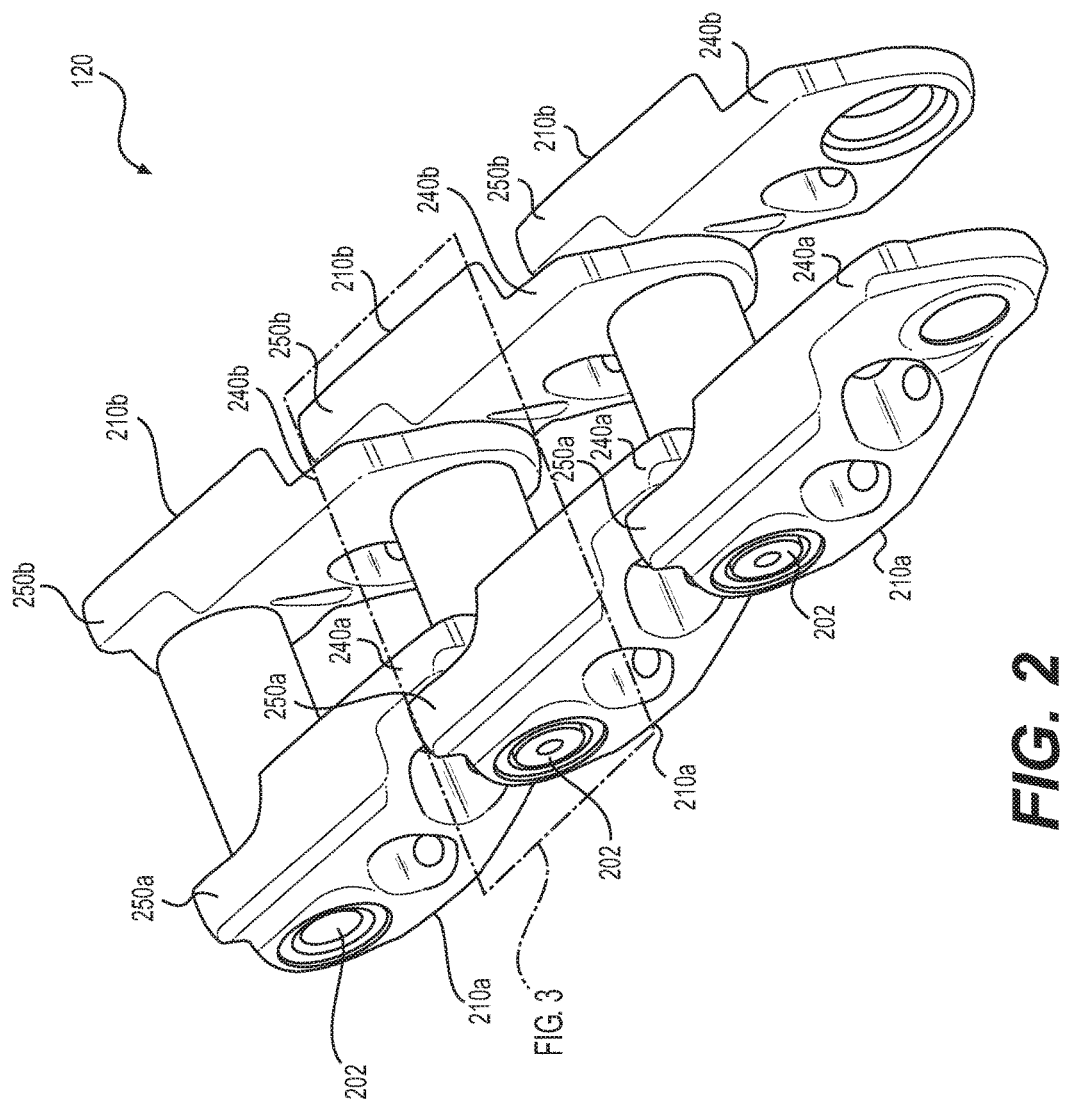
FIG. 2 is a perspective view of the track joint assembly of FIG. 1.

As shown in FIG. 2, the track joint assembly 120 may include a series of links 210a joined to each other and to a series of links 210b by laterally disposed pins 202. As shown, links 210a and 210b may be offset links. That is, they may have inwardly offset ends 240a, 240b and outwardly offset ends 250a, 250b. An inwardly offset end 240a, 240b of each link 210a, 210b may be joined to an outwardly offset end 250a, 250b of each adjacent link 210a, 210b. In addition, an inwardly offset end 240a of each link 210a may be joined to an inwardly offset end 240b of an opposing link 210b, and an outwardly offset end 250a of each link 210a may be joined to an outwardly offset end 250b of an opposing link 210b. It should be understood, however, that the links 210a and 210b need not be offset links. Rather, in some embodiments, the links 210a and 210b may be inner links and outer links. In such embodiments, both ends of each opposing pair of inner links would be sandwiched between ends of opposing outer links, as is known in the art.

Figure 3:
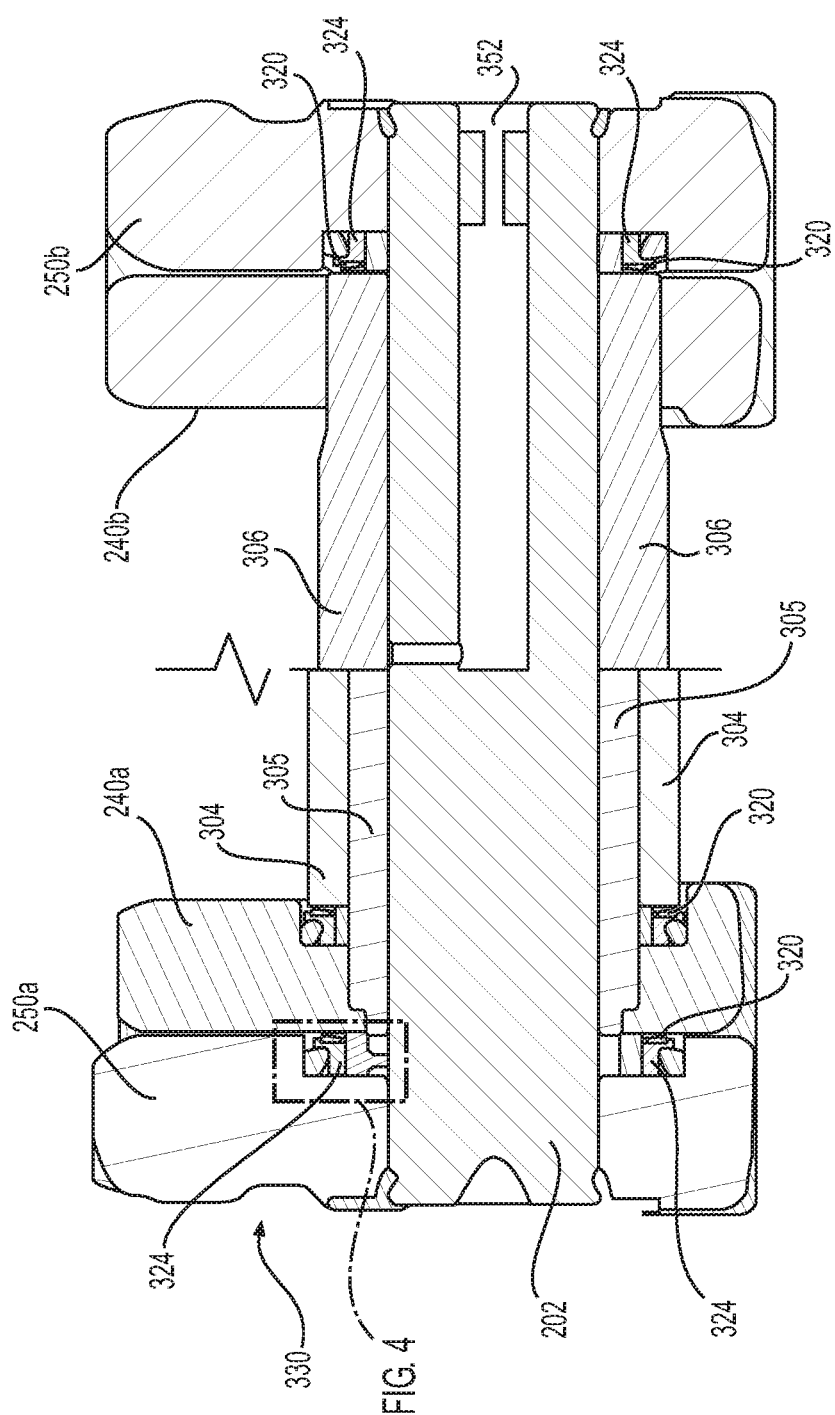
FIG. 3 is a cross-section of the identified portion of the track joint assembly shown in FIG. 2.

Referring to FIGS. 2 and 3, each pivotal section 330 of the track joint assembly 120 may include two links 210a joined to two links 210b. As shown, the inwardly offset ends 240a, 240b of the links 210a, 210b may be secured by pins 202 and bushings 304, 305, 306 (FIG. 3). The left-hand side of FIG. 3 illustrates one possible embodiment, wherein the pin 202 secures the outwardly offset ends 250a, 250b of the links 210a, 210b, and an inner joint bushing 305 and outer joint bushing 304 surround a portion of the pin 202 and secure and space the inwardly offset ends 240a, 240b of the links 210a, 210b. The right-hand side of FIG. 3 illustrates one possible alternative embodiment, wherein the pin 202 secures the outwardly offset ends 250a, 250b of the links 210a, 210b, and a single joint bushing 306 surrounds a portion of the pin 202 and secures the outwardly offset ends 250a, 250b of the links 210a, 210b. A central axial bore through the pin 202 may provide a lubricant passageway 352, configured for providing lubricant to the relatively rotating surfaces of the pin 202 and bushing 306.

The inner joint bushing 305 of the embodiment shown on the left-hand side of FIG. 3 may be at least partially positioned within first bores through the inwardly offset ends 240a, 240b of the links 210a, 210b, respectively. Opposite axial ends of the inner joint bushing 305 surrounding the pin 202 may abut against inner shoulders created by counterbores through the inwardly offset ends 240a, 240b of the links 210a, 210b, and against thrust rings 440 positioned within counterbores formed in the axially inner faces of each outwardly offset end 250a, 250b. Opposite axial ends of the outer joint bushing 304 surrounding the inner joint bushing 305 and the pin 202 may abut against inserts set into axially inner faces of the inwardly offset ends 240a, 240b of the links 210a, 210b. The inner joint bushing 305 may be rotatable relative to the pin 202 and fixed relative to the inwardly offset ends 240a, 240b. The outer joint bushing 304 may be free to rotate relative to the inner joint bushing 305 and relative to the inwardly offset ends 240a, 240b.

The joint bushing 306 of the embodiment shown on the right-hand side of FIG. 3 may surround at least a portion of the pin 202 and may be at least partially positioned within first bores through the inwardly offset ends 240a, 240b of the links 210a, 210b. Opposite axial ends of the joint bushing 306 may abut against inserts set into counterbores formed in the axially inner faces of the outwardly offset ends 250a, 250b of the links 210a, 210b. The joint bushing 306 may be free to rotate relative to the pin 202, and may be fixed relative to the inwardly offset ends 240a, 240b.

In both of the embodiments shown on the left-hand and right-hand sides of FIG. 3, the outwardly offset ends 250a, 250b at the opposite ends of the links 210a, 210b may be secured to opposite ends of the pin 202 by way of press-fits. The embodiment shown on the left-hand side of FIG. 3 may include bores through the inwardly offset ends 240a, 240b that accommodate opposite ends of the inner joint bushing 305, and that may be larger in diameter than the bores through the outwardly offset ends for accommodating the pin 202. Specifically, the inner joint bushing 305 may be press-fit into the larger diameter bores through the inwardly offset ends 240a, 240b, and the pin 202 may be press-fit into the smaller diameter bores through the outwardly offset ends 250a, 250b. The inner joint bushing 305 may be secured to the inwardly offset ends 240a, 240b in ways other than press fitting, such as by way of welds, snap rings, or other mechanisms known in the art.

In the alternative embodiment shown on the right-hand side of FIG. 3, the joint bushing 306 may be press fit into larger diameter bores through the inwardly offset ends 240a, 240b, with opposite axial ends of the joint bushing 306 abutting against inserts set into axially inner faces of the outwardly offset ends 250a, 250b of the links 210a, 210b. The joint bushing 306 may be fixed relative to the inwardly offset ends 240a, 240b, and free to rotate relative to the pin 202 and relative to the outwardly offset ends 250a, 250b.

Figure 4:
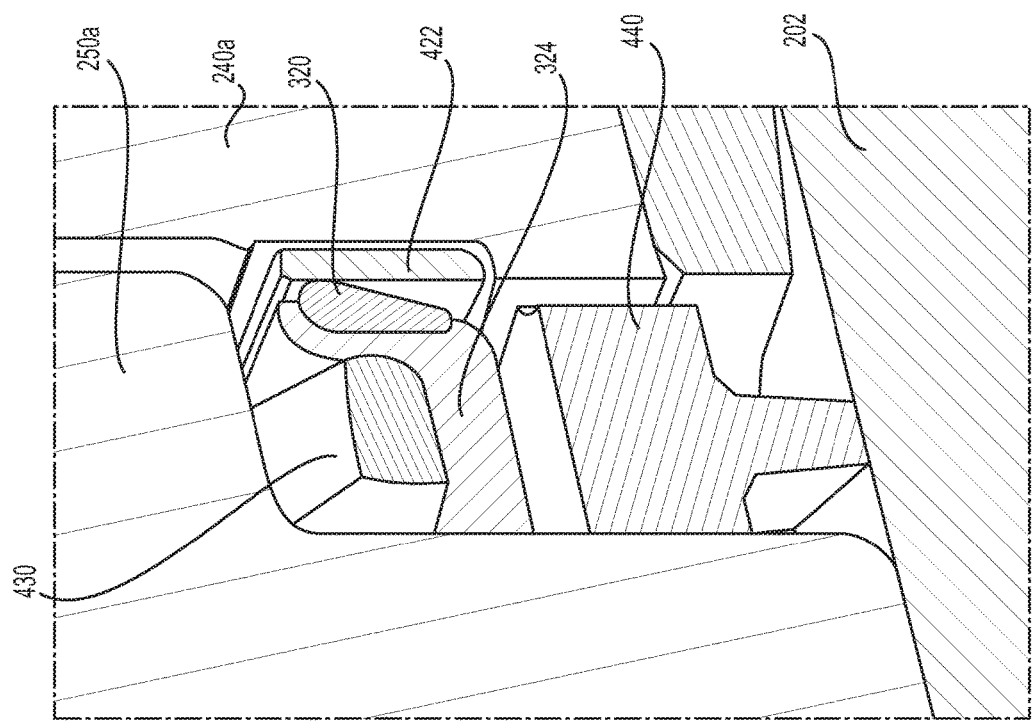
FIG. 4 is an enlarged partial perspective view of an identified portion of FIG. 3.

In the embodiment shown on the left-hand side of FIG. 3 and in the enlarged portion illustrated in FIG. 4, the inserts in counterbores on the axially inner faces of outwardly offset ends 250a, 250b of the links 210a, 210b may include first portions of seal assemblies and thrust rings 440. The thrust rings 440 may be positioned radially inwardly from the seal assemblies, and may be configured to take up axial loads from an adjacent track link and/or from axial ends of joint bushings. The first portions of the seal assemblies may each include a polyurethane seal lip 320 joined or molded integrally with an annular, L-shaped polycarbonate supporting ring 324. The seal lips 320 and supporting rings 324 may be positioned radially outwardly from, or even supported on radially outer surfaces of the thrust rings 440. Second portions of the seal assemblies may include annular metal sealing washers 422 that may be laser brazed to an axial outer face of an inwardly offset end 240a of an adjacent track link 210a. Alternative implementations may include the seal lip 320 and supporting ring 324 being formed from one or more different materials, such as an L-shaped metal member, or an L-shaped metal supporting member and another metal washer.

The annular metal sealing washers 422 laser brazed to an axial outer face of the track link 210a may alternatively be formed as an annular hard-faced surface on a portion of the axial outer face of the track link 210a. Various alternative implementations may include the annular metal sealing washers 422 laser brazed in a recess formed into the axial outer face of the inwardly offset end 240a of the track link 210a, or flush with the axial outer face that does not include a recess. The annular metal sealing washer 422 may include an axial support face that engages with the track link 210a, inner and outer diameter surfaces, and an axial sealing face opposite from the axial support face. An annular recess formed in the axial outer face of the inwardly offset end 240a of the track link 210a may be configured to position each of the annular metal sealing washers 422 with the axial sealing face of each washer slidably engaged with the sealing lip 320 supported on the supporting ring 324 on an opposed axial outer face of an adjacent track link. The engagement between the axial sealing face of each washer and the sealing lip 320 on the adjacent track link may provide a seal against contaminants and lubricants that may try to pass between the outwardly offset ends 250a, 250b and inwardly offset ends 240a, 240b of the track links 210a, 210b as they pivot relative to each other.

As shown in FIG. 4, an exemplary implementation may include the sealing lip 320 supported by the L-shaped supporting member 324 in a first portion of the seal assembly contained within an outwardly offset end 250a of a first track link, wherein the sealing lip 320 may be configured to be slidably engaged with the annular metal sealing washer 422 joined to or integral with an opposed inwardly offset end 240a of an adjacent, second track link. Another sealing and/or biasing load member 430 may be positioned on an opposite side of the supporting member 324 from the sealing lip 320. The sealing and/or biasing load member 430 may be positioned between the L-shaped supporting member 324 and an inner surface of the counterbore formed in the axially inner face of the outwardly offset end 250a. The thrust ring 440 may be positioned radially inwardly of the L-shaped supporting member 324 and the annular sealing lip 320. The thrust ring 440 may transmit axial loads between each outwardly offset end 250a, 250b and an adjacent inwardly offset end 240a, 240b, and may limit axial loads on the seal assemblies positioned radially outwardly of the thrust rings 440 to form hermetic seals between the adjacent track links 210a or 210b. The annular sealing lip 320 on an outwardly offset end 250a, 250b, and the annular metal sealing washer 422 on an inwardly offset end 240a, 240b may be configured to slidably engage with each other in order to retain lubricating fluid that may be provided from an adjacent lubricating fluid cavity. In accordance with various implementations of this disclosure, the annular metal sealing washers 422 may be laser brazed to the inwardly offset ends 240a, 240b of the track links 210a, 210b, as will be explained in more detail below.

The first portions of the seal assemblies included in between axially inner surfaces of outwardly offset ends 250a, 250b and axially outer surfaces of inwardly offset ends 240a, 240b may be maintained in position radially inwardly and axially inwardly from the bottom corners of the counterbores formed in the outwardly offset ends 250a, 250b by the sealing and/or biasing load members 430. Additionally or alternatively, the first portions of the seal assemblies may be positioned radially outwardly of the inner joint bushing 305 by the thrust ring 440, as shown in FIG. 3. Each first portion of the seal assembly may be positioned in opposition to the annular metal sealing washer 422 of the inwardly offset end 240a of the link 210a that faces the outwardly offset end 250a of an adjacent link 210a. As a result, the seal lip 320 may be slidably engaged with the axial sealing face of the annular metal sealing washer 422 when the track links are assembled into a cartridge of a track joint assembly. The annular metal sealing washer 422 may include a different material from other portions of the link 210a. That is, the sealing surfaces in contact with each other may have different material properties from other portions of the link 210a. The different materials may have a different wear resistance than material of the other portions, and may better resist wear and corrosion resulting from sliding contact between the surfaces as adjacent links pivot relative to each other. For example, the different materials may include an electroless nickel coating, a nitride coating, or a carburized coating. In some exemplary implementations the annular metal sealing washer 422 may be made from 420 stainless steel and coated with a hard, wear-resistant coating. Examples of coatings that may be applied to the washer 320 may include High Velocity Oxygen Fuel (HVOF) coatings, thermal spray coatings, NiCr coatings that may be mechanically bonded to the washer, and laser clad coatings.

In accordance with various implementations of this disclosure, the annular metal sealing washer 422 may be laser brazed to the axially outer face of the inwardly offset end 240a of the track link 210a in each track joint assembly cartridge. Other alternative implementations may include laser welding the washer to the track link, fastening the washer in place using an adhesive, or even holding the washer in place by an annular biasing member positioned at an inner diameter or an outer diameter of the washer. The annular metal sealing washer 422 may be clad (e.g., laser clad) to the material of a portion of the axially outer surface of the inwardly offset end 240a of the link 210a. Alternatively, the annular metal sealing washer 422 may be replaced with an annular-shaped portion of the axial outer face of the track link provided with a hard-faced coated surface, such as a laser hardened or a thermal sprayed material. In yet another alternative, the different material may be a thin film coating of, for example, chromium nitride, amorphous diamond-like carbon, or tetrahedral amorphous carbon As further shown in FIG. 3, a similar seal assembly and thrust ring combination may be provided as an insert in a counterbore formed at the axially inner surface of the inwardly offset ends 240a, 240b. The seal assemblies at the axially inner surfaces of the inwardly offset ends 240a, 240b may include the annular metal sealing washers 422 slidably engaged with opposite axial ends of the outer joint bushings 304. In various implementations, the annular metal sealing washers 422 may be coated with wear resistant coatings as described above. The process of laser brazing the sealing washers 422 to the track links 210a, 210b provides an advantageous method for joining the washers since the amount of heat input is small enough to avoid creating any distortion of the washer or the sealing surface of the washer, and small enough to avoid causing delamination of any coating that may be applied to the washer for improved wear resistance.

In various alternative embodiments of the track joint assembly, opposite axial ends of a joint bushing extending between the links 210a, 210b may abut against sealing washers of seal assemblies at least partially inserted into counterbores on the inwardly offset ends 240a, 240b, rather than on the outwardly offset ends 250a, 250b, as shown on the right-hand side of FIG. 3. The joint bushing may extend between the first and second links 210a, 210b, and may be rotatable relative to the pin 202 and relative to the links. In these alternative embodiments the joint bushing may not extend into bores through the links, with the length of the joint bushing being approximately the same as the distance between the first and second links. The pin 202 may extend through a central axial bore through the joint bushing, and may be secured in various ways to the first and second links. Because such a configuration may allow the joint bushing to rotate relative to the pin 202 and relative to the links 210a, 210b, this feature may reduce the amount of scuffing and wear on the outer diameter surface of the joint bushing as the joint bushing comes into contact with drive sprocket teeth of a drive sprocket on a track-type machine.

As shown in the implementations of FIGS. 2 and 3, the pin 202 may be positioned coaxially inside a central axial bore through the joint bushings 304, 305, 306. The joint bushings 304, 305, 306 may rotate relative to the pin 202, allowing inwardly offset ends 240a, 240b to pivot relative to outwardly offset ends 250a, 250b as each track joint assembly 120 rotates. In order to facilitate such rotation, the outer diameter surface of the pin 202 may be coated with a diamond-like carbon (DLC) coating to reduce friction between the joint bushings and the pins. DLC as used herein may refer to carbon based thin films, which may include amorphous diamond-like carbon (a-DLC), or ta-C for tetrahedral amorphous carbon. a-DLC may be further classified as amorphous carbon (a-C), or hydrogenated amorphous carbon (a-C:H). Alternative implementations may include coating an inner diameter surface of the central axial bore through the joint bushing, rather than the outer diameter surface of the pin. In some implementations, at least the outer diameter surface of the pin may be provided with an isotropic surface finish and a hard thin film that includes the DLC coating over the isotropic surface finish.

Figure 5:
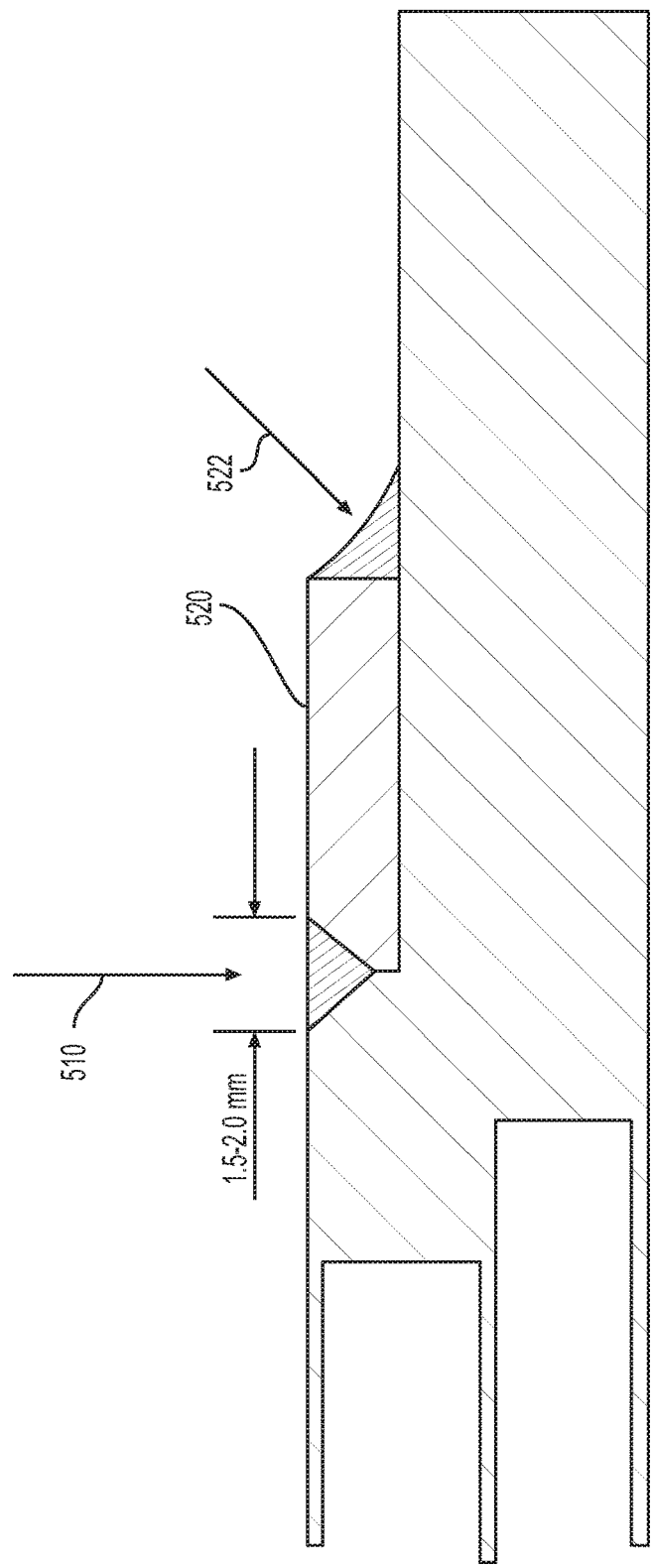
FIG. 5 is a cross section of an exemplary implementation of a sealing washer laser brazed to a track link.
Figure 6:
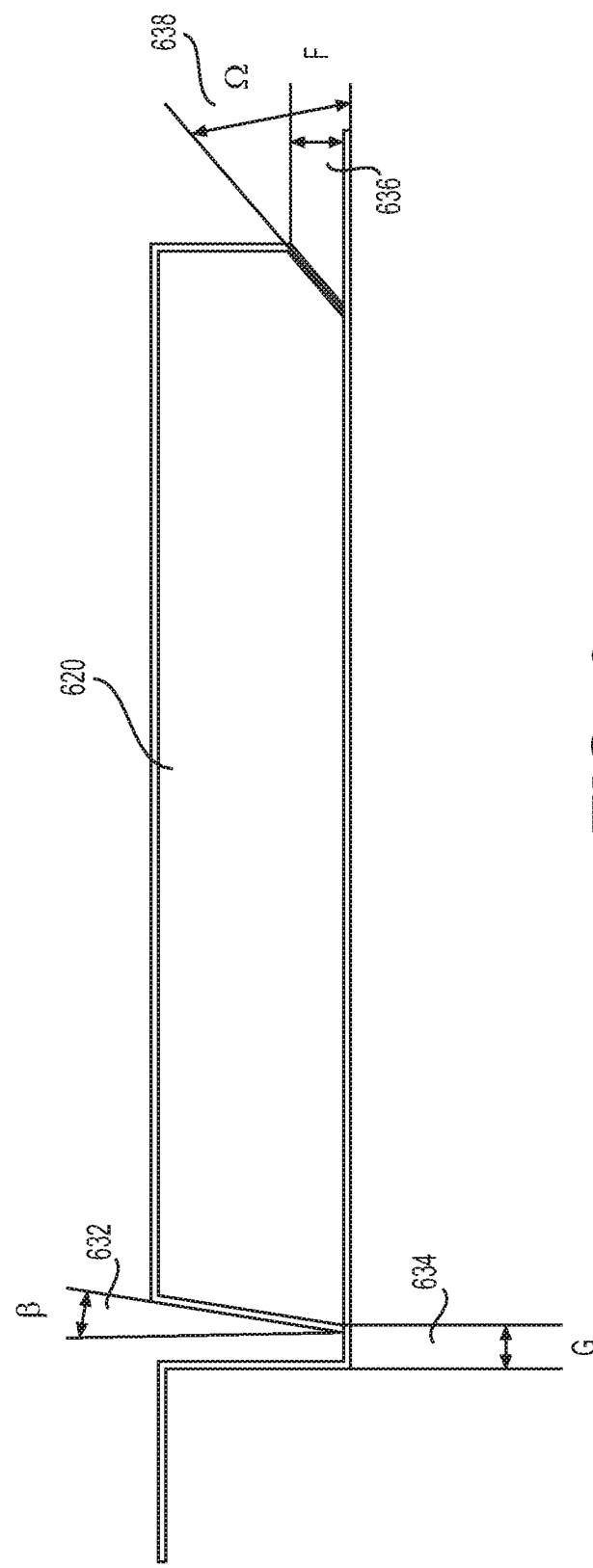
FIG. 6 is a cross section of an exemplary implementation of a sealing washer for a seal assembly.

FIGS. 5 and 6 illustrate details of possible implementations for laser brazing annular metal sealing washers 520, 620 to a portion of a track link. The washers 520, 620 may be positioned radially outwardly or radially inwardly from an annular shoulder of a recess formed in the axial face of a track link. As shown in FIG. 5, the washer 520 may be brazed at both inner and outer diameter surfaces of the washer. In the illustrated exemplary implementation where the washer is positioned radially outwardly from the annular shoulder on the track link, the result may be an annular fillet 510 of laser braze material at the intersection between the inner diameter surface of the washer and the annular shoulder on the track link. In alternative implementations where the washer is positioned radially inwardly from an annular shoulder on the track link, the annular fillet 510 of laser braze material may be formed at the intersection between the outer diameter surface of the washer and the annular shoulder on the track link. One of ordinary skill in the art will recognize that the annular metal sealing washers 520, 620 may be laser brazed to an axial face of a track link without any recess being formed in the axial face. In such an implementation, where the washer protrudes axially outwardly past the axial face of the track link, the portion of the seal assembly set into a counterbore formed in the axial face of an adjacent track link may provide the desired clearance to accommodate the washer. The thrust ring 440 may also be sized accordingly in order to absorb the majority of axial loads between the adjoining track links and accommodate the thickness of the annular metal sealing washer 422 between the track links.

Alternatively or in addition to the annular fillet 510 of laser braze material formed at the joint between the inner or outer diameter surface of the washer and the annular shoulder on the track link, another annular fillet 522 of laser braze material may be formed at the intersection between the inner or outer diameter surface of the washer that is not adjacent to a shoulder on the track link and a surface of the track link orthogonal to the central axis of the track link. As shown in FIG. 6, the inner and outer diameter surfaces of an exemplary annular sealing washer 620 may be laser cut or otherwise machined to provide a greater amount of surface area for the braze material to contact. The exemplary implementation shown in FIG. 6 includes the outer diameter surface of the washer configured to form an angle β (632) with an orthogonal projection to the front and back surfaces of the washer 620. The washer 620 may also be offset from an adjacent shoulder of the recess formed in an axial face of the track link by an amount G (634) in order to provide the desired size of a fillet that will result when the washer is laser brazed to the track link. The inner diameter surface of the washer may be laser cut or otherwise machined or formed to include a chamfer extending a distance F (636) from the axial supporting surface of the washer, with the chamfer forming an angle Ω (638) relative to the axial face of the track link. One of ordinary skill in the art will recognize that the dimensions and locations of the angles and chamfers on the inner and/or outer diameter surfaces of the washer may be varied depending on the size of the parts, the laser braze material, the amount of heat input that will be applied during the laser brazing process, the speed at which the laser brazing operation is performed, the desired amount of wicking or wetting of the molten braze material into the joints between the washer and the track joint, and other brazing parameters.

The laser brazing process typically requires only a relatively small amount of heat input directly to the area where a braze wire is applied to the joint, and therefore the heat affected zone (HAZ) on the washer and the track joint is much smaller than would be the case for a welding process. In conventional brazing processes the parts that are being joined may be placed into a brazing oven with the brazing material sandwiched between the parts to be joined, and the parts and the brazing material then uniformly heated past the melting point for the brazing material. In contrast, the laser brazing process in accordance with various implementations of this disclosure only heats the brazing wire and the immediate area at the joint around the wire. A laser braze head supplying the braze wire and heat input to the joint may move rapidly around the circumference of the washer being joined to the track link, or the washer and track link may be moved rapidly past the laser braze head to produce the annular fillets of laser braze material at the desired joints. In one exemplary implementation, the laser braze wire may comprise $CuSi_3$. Because of the relatively small amount of heat input to the parts being joined by the laser brazing process, there may be very little wicking of the molten laser braze material into any gap between the parts. Therefore, the dimensions of the angles and/or chamfers formed on the surfaces to be joined may be at least partially determined based on the amount of surface area of the parts that must be bonded to the laser braze material in order to meet desired torsional strength of the joint and other design parameters. One of ordinary skill in the art will recognize that other configurations of the laser brazing surfaces at the inner and/or outer diameters of the washer may be employed. The laser brazing process may provide significant advantages over other methods of joining the annular metal sealing washers to the track links. Some advantages may result from the low heat input required when laser brazing. The low heat input as compared to the heat input for welding may avoid causing any distortion of the washer, including any distortion of the axial sealing surface of the washer configured to engage an adjacent track link surface or bushing to seal against the passage of lubricants or other fluids. The low heat input associated with laser brazing may also avoid any potential delamination of any coating that may be applied first to the washer in order to increase wear resistance or otherwise achieve desired properties for the seal assemblies provided between the track links.

INDUSTRIAL APPLICABILITY

The disclosed track joint assemblies may be applicable to track-type machines, such as, for example, loaders, tractors, excavators, and tanks, and may facilitate movement of the machines. The disclosed track joint assemblies may have various advantages over prior art track joint assemblies. For example, the disclosed track joint assemblies may be stronger and more durable than prior art track joint assemblies. In addition, the disclosed methods may enable more rapid manufacturing of more reliable and longer lasting track joint assemblies. The disclosed methods of laser brazing a sealing washer to a track link may provide considerable cost savings and increased wear life for seal assemblies used at various interfaces between track links as compared to known conventional methods. The use of a separate sealing washer that may be coated first with a desired hard, wear-resistant coating before being joined to the seal assembly may provide cost savings and manufacturing efficiencies over direct hard-facing of seal surfaces on the track links themselves.

The track joint assembly 120 manufactured with seal assemblies configured in accordance with various implementations of this disclosure may be particularly well suited for high speed, high volume, automated manufacturing operations. The sealing washers may be manufactured at low cost without a requirement for precise dimensional tolerances since the disclosed laser brazing process allows for larger gaps and tolerances between the parts being joined than other joining methods such as welding. The sealing washers may also be provided with hard, wear-resistant coatings that increase the reliability and longevity of the seal assemblies on the track joint assemblies. The laser brazing process as disclosed herein enables joining of the sealing washers that are already provided with hard, wear-resistant coatings to track links as part of seal assemblies without the risk of delamination of the coatings or distortion of critical sealing surfaces on the washer.

As disclosed herein, the method of manufacturing a seal assembly for an undercarriage track joint assembly may include forming a first portion of the seal assembly configured for engagement within a counterbore formed in an axial face of a track link 210a, 210b. As discussed above, the first portion of the seal assembly set into a counterbore formed in an axial face of a first track link may include multiple parts such as the rubber annular load ring 430, the polycarbonate supporting ring 324, and the annular polyurethane seal lip 320. The method may include laser brazing an annular, metal sealing washer 422 to a second track link such that the washer 422 is positioned at least partially within a recess formed in an axial face of the track link or flush with an axial face of the track link that does not have a recess. The washer 422 may be positioned one of radially inwardly or radially outwardly from an annular shoulder formed by a recess in the axial face of the track link. The washer 422 may be supported by the second track link such that an axial sealing face of the washer is positioned to be slidably engaged with the seal lip 320 of the first portion of the seal assembly mounted in the counterbore on the first track link. The axial sealing face of the washer 422 may be one of flush with an annular shoulder on the second track link or protruding beyond the shoulder. The thickness of the washer, and the amount by which the axial sealing face of the washer protrudes beyond the annular shoulder or axial face on the second track link may be determined based on an expected wear rate of the sealing face and a desired wear life for the joint assembly. The annular load ring 430 (FIG. 4) positioned between the L-shaped supporting member 324 and an inner surface of the counterbore formed in the axially inner face of the outwardly offset end 250a may provide an axial biasing force against the supporting member 324 and seal lip 320 to move the seal lip 320 toward the annular metal sealing washer 422 mounted on the adjacent track link as the axial sealing face of the washer is worn during use.

The method of manufacturing a seal assembly may further include performing the laser brazing of the washer to the track link to form at least one of an annular fillet of braze material between the track link and at least a portion of an inner diameter surface of the washer, and an annular fillet of braze material between the track link and at least a portion of an outer diameter surface of the washer. As described above, the annular metal sealing washer may be provided with a chamfer extending at least partially along at least one of the inner diameter surface and the outer diameter surface of the washer. The chamfer may extend at least partially along at least one of the inner diameter surface and the outer diameter surface of the washer from the axial supporting face of the washer opposite from the axial sealing face of the washer. The annular metal sealing washer may include the chamfer extending at least partially along one of the inner diameter surface and the outer diameter surface of the washer, and the other of the inner diameter surface and the outer diameter surface of the washer may form an acute included angle with the axial supporting face of the washer opposite from the axial sealing face of the washer.

As shown in FIG. 5, the laser brazing of the sealing washer to the axial face of the track link may form at least one annular fillet of braze material 510 with a top surface of the annular fillet extending substantially parallel to the axial sealing face of the washer. The at least one annular fillet of braze material 510 may be formed in approximately the shape of an isosceles triangle with the top surface of the annular fillet forming a base of the isosceles triangle. The width of the base may be one of approximately equal to or within ±20% of the altitude of the isosceles triangle formed by a perpendicular bisector of the base. In one exemplary implementation, the width of the base of the isosceles triangle (or the width of the top surface of the fillet of braze material) may fall within a range from approximately 1.5-2.0 mm, and the altitude of the isosceles triangle (or the depth of the fillet of braze material) may be less than or equal to approximately 1.6 mm, or the thickness of the washer. The laser brazing of the sealing washer may also include forming another annular fillet of braze material 522 at an intersection between an axial supporting face of the washer opposite from the axial sealing face of the washer and one of the inner diameter surface or the outer diameter surface of the washer. In some implementations of this disclosure it may be desirable to only form one of the two annular fillets of braze material around either the inner diameter surface or the outer diameter surface of the annular sealing washer. In other implementations of this disclosure, both annular fillets of braze material at the inner and outer diameter surfaces of the washer may be desired. The annular fillet of braze material at the outer diameter surface of the washer may be configured to prevent the ingress of contaminants inwardly past the facing surfaces of an outwardly offset end of a track link and an inwardly offset end of an adjacent track link toward the pin and bushing that pivotally join the track links. In still further implementations of this disclosure, only the annular fillet of braze material at the inner diameter surface of the washer may be desired to prevent the egress of lubricants outwardly past the facing surfaces of the outwardly offset end of a track link and the inwardly offset end of the adjacent track link.

It will be apparent to those skilled in the art that various modifications and variations can be made to the disclosed methods of forming seal assemblies for track joint assemblies. Other embodiments will be apparent to those skilled in the art from consideration of the specification and practice of the disclosed methods. It is intended that the specification and examples be considered as exemplary only, with a true scope being indicated by the following claims and their equivalents.

What is claimed is:

1. A method of manufacturing an undercarriage track joint assembly, the method comprising:
   forming at least a first portion of a seal assembly by laser brazing an annular, metal sealing washer to a first track link of the undercarriage track joint assembly;
   performing the laser brazing to form at least one of an annular fillet of braze material between the first track link and at least a portion of an inner diameter surface of the washer and an annular fillet of braze material between the first track link and at least a portion of an outer diameter surface of the washer; and
   inserting a second portion of the seal assembly into a counterbore formed in an axial face of a second track link of the track joint assembly such that an axial sealing face of the washer opposite from the first track link slidably engages with the second portion of the seal assembly on the second track link of the track joint assembly to form a sealing surface between the first and second track links.

2. The method of claim 1, further including providing the annular metal sealing washer with a chamfer extending at least partially along at least one of the inner diameter surface and the outer diameter surface of the washer.

3. The method of claim 2, wherein the chamfer extends at least partially along at least one of the inner diameter surface and the outer diameter surface of the washer from an axial supporting face of the washer opposite from the axial sealing face of the washer.

4. The method of claim 2, further including providing the annular metal sealing washer with a chamfer extending at least partially along one of the inner diameter surface and the outer diameter surface of the washer, and with the other of the inner diameter surface and the outer diameter surface of the washer forming an acute included angle with an axial supporting face of the washer opposite from the axial sealing face of the washer.

5. The method of claim 1, further including performing the laser brazing to form one of the at least one annular fillet of braze material with a top surface of the annular fillet extending substantially parallel to the axial sealing face of the washer.

6. The method of claim 5, wherein the one of the at least one annular fillet of braze material is formed in approximately the shape of an isosceles triangle with the top surface of the annular fillet forming a base of the isosceles triangle, and the width of the base being one of approximately equal to or within ±20% of the altitude of the isosceles triangle formed by a perpendicular bisector of the base.

7. The method of claim 1, further including performing the laser brazing to form one of the at least one annular fillet of braze material at an intersection between an axial supporting face of the washer opposite from the axial sealing face of the washer and one of the inner diameter surface or the outer diameter surface of the washer.

8. The method of claim 1, further including performing the laser brazing with the annular metal sealing washer held in position relative to the first track link such that one of the inner diameter surface or the outer diameter surface of the washer is spaced from an annular shoulder formed in the first track link by an amount that is less than a thickness of the washer.

9. The method of claim 8, wherein the washer is held in a position spaced from the annular shoulder of the first track link by one of a plurality of tack welds spaced around the circumference of the washer or a fixture configured to maintain the washer at a desired spacing from the annular shoulder of the first track link during laser brazing of the annular fillets of brazing material.

10. A method of manufacturing a seal assembly for an undercarriage track joint assembly, the method comprising:
    forming at least a first portion of the seal assembly for engagement within a counterbore formed in an axial face of a first track link of the undercarriage track joint assembly;
    laser brazing an annular, metal sealing washer to a second track link of the undercarriage track joint assembly such that the washer is positioned on an axial end face of the second track link with an axial sealing face of the washer configured to be slidably engaged with the first portion of the seal assembly when the first and second track links are assembled into the undercarriage track joint assembly; and
    performing the laser brazing to form at least one of an annular fillet of braze material between the second track link and at least a portion of an inner diameter surface of the washer and an annular fillet of braze material between the second track link and at least a portion of an outer diameter surface of the washer.

11. The method of claim 10, further including providing the annular metal sealing washer with a chamfer extending at least partially along at least one of the inner diameter surface and the outer diameter surface of the washer.

12. The method of claim 11, wherein the chamfer extends at least partially along at least one of the inner diameter surface and the outer diameter surface of the washer from an axial supporting face of the washer opposite from the axial sealing face of the washer.

13. The method of claim 11, further including providing the annular metal sealing washer with a chamfer extending at least partially along one of the inner diameter surface and the outer diameter surface of the washer, and with the other of the inner diameter surface and the outer diameter surface of the washer forming an acute included angle with an axial supporting face of the washer opposite from the axial sealing face of the washer.

14. The method of claim 10, further including performing the laser brazing to form one of the at least one annular fillet of braze material with a top surface of the annular fillet of braze material extending substantially parallel to the axial sealing face of the washer.

15. The method of claim 14, wherein the one of the at least one annular fillet of braze material is formed in approximately the shape of an isosceles triangle with the top surface of the annular fillet forming a base of the isosceles triangle, and the width of the base being one of approximately equal to or within ±20% of the altitude of the isosceles triangle formed by a perpendicular bisector of the base.

16. The method of claim 10, further including performing the laser brazing to form one of the at least one annular fillet of braze material at an intersection between an axial supporting face of the washer opposite from the axial sealing face of the washer and one of the inner diameter surface or the outer diameter surface of the washer.

* * * * *